United States Patent [19]

Fleming et al.

[11] 4,123,142

[45] Oct. 31, 1978

[54] AMBIGUITY PLANE OPTICAL PROCESSOR INCORPORATING MAGNETO-OPTIC, BUBBLE DOMAIN HISTOGRAPH

[75] Inventors: David L. Fleming, Edina; Thomas R. Johansen, Minneapolis; Ernest J. Torok, St. Paul, all of Minn.

[73] Assignee: Sperry Rand Corporation, New York, N.Y.

[21] Appl. No.: 772,880

[22] Filed: Feb. 28, 1977

[51] Int. Cl.² .................... G06G 9/00; G03H 1/16
[52] U.S. Cl. ...................... 350/162 SF; 350/3.83; 350/3.85; 364/822
[58] Field of Search .............. 350/3.5, 162 SF, 3.83, 350/3.85; 340/5 H; 343/17; 364/822

[56] References Cited

U.S. PATENT DOCUMENTS

| | | | |
|---|---|---|---|
| 3,479,494 | 11/1969 | Wilmotte | 350/162 SF |
| 3,519,331 | 7/1970 | Cutrona et al. | 350/162 SF |
| 3,756,683 | 9/1973 | Smith | 350/162 SF |
| 3,895,341 | 7/1975 | Pekau | 350/3.5 |

Primary Examiner—Ronald J. Stern
Attorney, Agent, or Firm—Kenneth T. Grace; William E. Cleaver; Marshall M. Truex

[57] ABSTRACT

A system for optically correlating two signals, e.g., radar, sonar, etc., incorporating both time shifts and doppler shifts is described. The correlation of the signals is produced as a two-dimensional distribution of light on a light detector/display plane wherein the amplitude of the light distribution is proportional to the correlation of the two signals as a function of relative time shifts, $\Delta t$ (X direction), and relative doppler shifts, $a\omega$ (Y direction), between the signals. Doppler shifts are introduced into the processor by the incorporation of a channelized cylindrical lens in one signal channel while using a cylindrical lens in the other signal channel.

5 Claims, 5 Drawing Figures

AMBIGUITY PLANE OPTICAL PROCESSOR INCORPORATING MAGNETO-OPTIC, BUBBLE DOMAIN HISTOGRAPH

BACKGROUND OF THE INVENTION

Processing of data via optical means is well known in the art, the primary advantage being that optical processing of large amounts of data is achieved in a highly parallel, substantially instantaneous manner. Coherent optical processors have been proposed to perform many and varied functions including Fourier-transformation analysis of analog signals and the correlation therebetween. In the text "Coherent Optical Computers," K. Preston, Jr., McGraw-Hill Book Company, 1972, particularly Section 1.70, Other Computational Modes, there is discussed the use of a coherent optical processor to determine the ambiguity plane of a function, $$\Psi(\Delta\omega, \Delta t) = \int f(t) f(t+\Delta t) e^{-j\Delta\omega t} dt$$

The present invention is directed toward a coherent optical processor that is utilized to determine the ambiguity plane of or the correlation between, two real-time analog signals with time shifts, $\Delta t$ and frequency shifts (doppler shifts), $\Delta\omega$, as the variables. Attention is also directed toward the publication "Several Optical Correlation Methods," A. Lohmann, International Optical Computing Conference, 1975, IEEE Catalog No. 75CH0941-5c, pages 142 – 144, Method 2, for an illustration of some typical optical processing concepts.

SUMMARY OF THE INVENTION

The present invention is directed toward a system for optically determining the ambiguity plane of two real-time analog signals in which time shift and doppler shift therebetween are the two variables. The two signals, after optical processing provide on a light detector/display, spots of light which in the X direction, representative of time shift, and in the orthogonal Y direction, representative of doppler shift, provide the time shift, doppler shift comparisons of the two signals. Doppler shift determination is achieved by the incorporation of a channelized cylindrical lens in one signal processing channel while a cylindrical lens is incorporated in the other signal processing channel. The Fourier transform of one signal is stored holographically in a filter plane, which filter plane is common to both channels, then the Fourier transform of the other signal is produced with a range of doppler shifts by the channelized cylindrical lens at the filter plane. The product of these transforms, the output of the filter plane, is transformed by the final cylindrical lens to produce the correlation of these signals as a function of the time shift, doppler shift, i.e., the ambiguity plane in the detection/display plane.

DESCRIPTION OF THE PREFERRED EMBODIMENT

Figure 1:
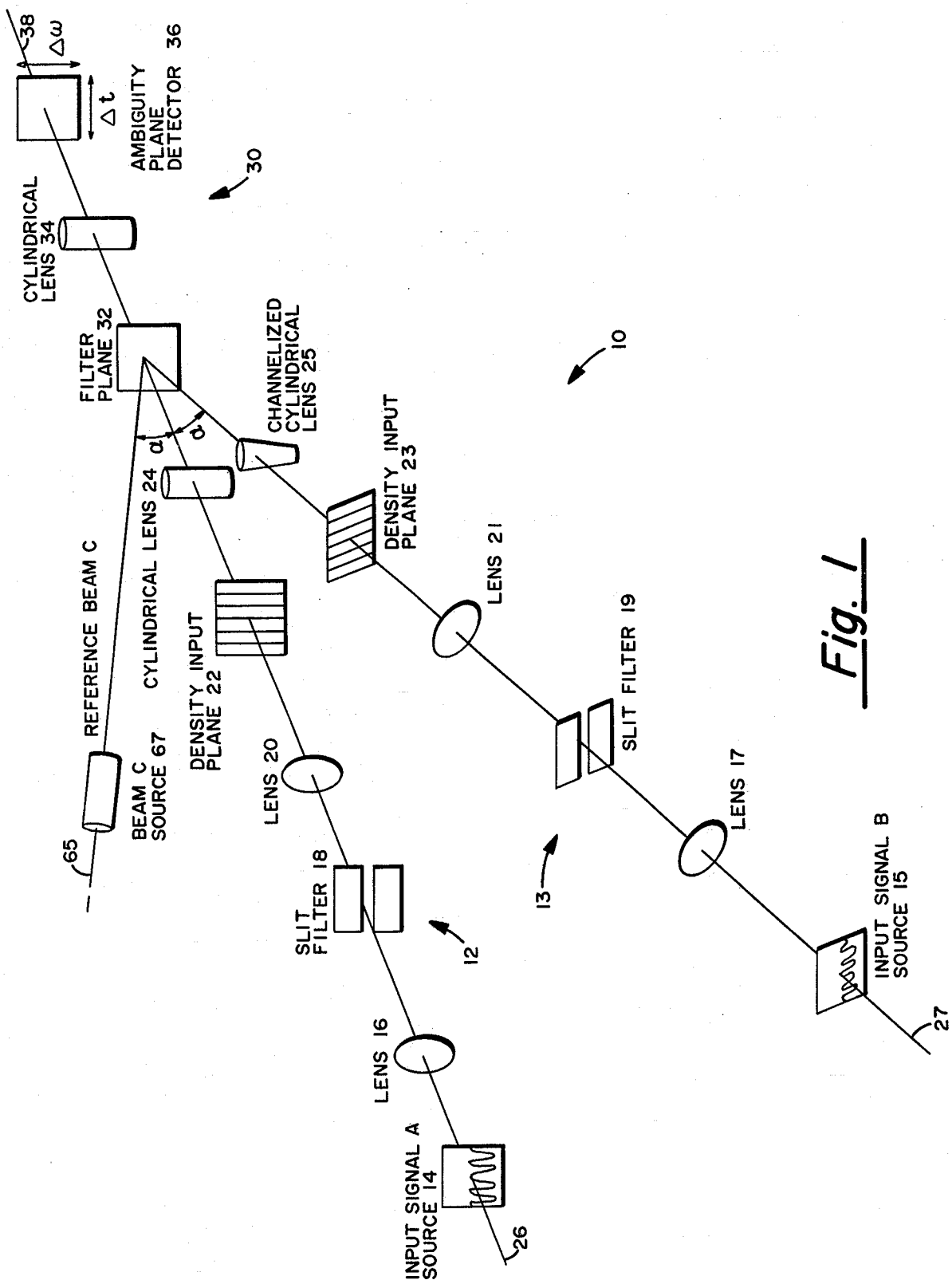
FIG. 1 is a diagrammatic illustration of the optical processing system of the present invention.

With particular reference to FIG. 1 there is presented a diagrammatic illustration of an optical processor incorporating a magneto-optic bubble domain histograph for calculating the ambiguity function, $\Psi(\Delta\omega, \Delta t)$, as given by the equation below:

$$\Psi(\Delta\omega, \Delta t) = \int A(t) B(t+\Delta t) e^{-j\Delta\omega t} dt$$

The optical processor 10 of FIG. 1 includes two separate signal processing channels: channel 12, which includes a source 14 of an area modulated input signal A, transform lens 16, slit filter 18, transform lens 20, density input plane 22 and cylindrical transform lens 24, all aligned along an optical axis 26; channel 13, which includes a source 15 of an area modulated input signal B, transform lens 17, slit filter 19, transform lens 21, density input plane 23, and channelized cylindrical transform lens 25, all aligned along an optical axis 27; and, a common signal processing channel 30, which includes filter plane 32, cylindrical transform lens 34 and an ambiguity plane detector/display 36, all aligned along an optical axis 38, all elements of which are separated by their respective focal lengths. Except for cylindrical lens 24 of channel 12 and channelized cylindrical lens 25 of channel 14, corresponding components of channel 12 and channel 14 are preferably substantially similar in design.

Figure 2:
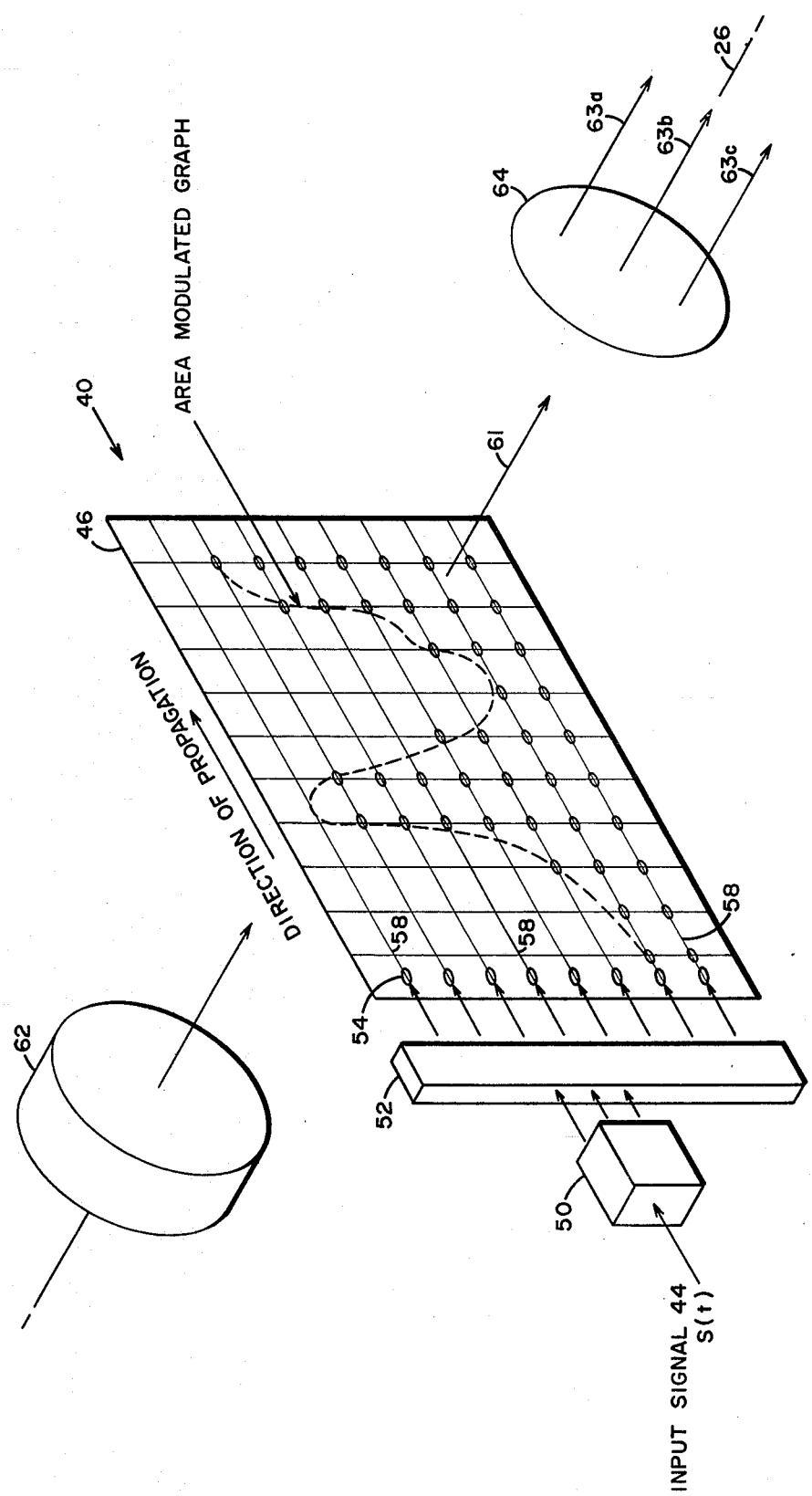
FIG. 2 is a diagrammatic illustration of a source of the area modulated input signals that are processed by the system of FIG. 1.

With particular reference to FIG. 2 there is presented a diagrammatic illustration of a source 40 of an area modulated input signal that may function as sources 14 and 15 of FIG. 1. Source 40 may be comprised of a magneto-optic bubble domain histograph such as that of the D. L. Fleming patent application Ser. No. 704,154, filed July 12, 1976 now patent No. 4,087,809. Histograph 42 is essentially a display system for providing a real-time dynamic presentation of an analog signal 44 waveform upon an optical display plane 46. The analog signal 44 that is to be displayed by the histograph 40, or bubble memory display system, on optical display plane 46 is, via line 48, coupled to A-D converter 50. A controller couples the appropriate control signals to A-D converter 50 causing it to sample analog signal 44 at regular sample time intervals of a frequency F. The digitized representations of the sampled signal amplitudes are, in turn, coupled to 1-out-of-M decoder 52, which, in turn, couples an appropriate current signal to one of its M output lines via a corresponding pulse generator and thence to the bubble generators 54 on optical display plane 46.

For each sample signal amplitude, the bubble generator 54, via appropriate drive fields, generates a vertical column of bubbles 56; the bubbles of each of the vertical columns of bubbles are then caused to move, in parallel, in a left to right direction along the corresponding horizontal guidance channels 58 of optical display plane 46. Each column of bubbles moves progressively from left to right, and at the righthand edge of optical display plane 46 it is destroyed or annihilated. The controller, by causing the bubble generator 52 to generate a column of bubbles 56 of a height that is associated with each sample signal amplitude, causes these associated bubbles 56 to move across optical display plane 46 at the sample frequency F so as to appear as a moving, area modulated display of the real-time analog signal 44. Visual observation of the moving display of bubbles 56 may be obtained by directing a plane-polarized, normally-incident, light beam 60, as from a laser 62, upon the back surface of optical display plane 46 and observing the front surface of optical display plane 46 via an analyzer 64.

The plane-polarized light beam 60 from laser 62 that is incident to the back surface of optical display plane 46 is selectively rotated—see the D. S. Lo, et al, U.S. Pat. No. 3,761,155—by each of the bubbles 56. Thus, only that portion of the plane-polarized light beam 60 that is incident to the individual bubbles 56, which pattern of bubbles 56 defines the area under the waveform of the input signal 44 on optical display plane 46, are properly rotated in light beam 61 to be passed by analyzer 64. Analyzer 64 passes a light beam 63 that is comprised of a plurality of individual beamlets 63a through 63n—the remaining portion of the light beam 63 being blocked or filtered out thereby—each of which beamlets is associated with an associated one of the bubbles 56. Thus, the light beam 63, which emerges from analyzer 64, consists of a plurality of beamlets, whose spatial distribution in a plane that is normal to the optical axis 26 is an area modulated light signal the modulation of which is controlled, in real-time, by a real-time display of the analog signal 44 on optical display plane 46, all as discussed in more detail in the hereinabove referenced D. L. Fleming patent application.

With reference back to FIG. 1, the area modulated input signal A, which, e.g., consists of a plurality of beamlets that are representative of the modulating signal 44 waveform of FIG. 2, from source 14 is, via transform lens 16, focused upon slit filter 18 to generate at slit filter 18 the Fourier transform of the area modulated input signal A. Slit filter 18 removes the frequency components of the area modulated input signal A due to the discreet nature of the area modulated input signal A representation, transmitting the Fourier transform of the signal A in a density representation. The output of slit filter 18, via lens 20, generates at density input plane 22 the Fourier transform of the Fourier transform of the signal A in a density representation, i.e., a density input (amplitude) of light that is proportional to the input signal A that was the input signal to the histograph 14—see FIG. 2. The density input plane 22 is a theoretical plane in the signal processing channel 12 with no real optical component positioned thereat. Next, cylindrical lens 24 transforms, in one dimension, the signal at the density input plane 22 producing the signal Fourier transform at filter plane 32.

This signal Fourier transform of signal A is then recorded in filter plane 32 holographically. This recording of the signal Fourier transform in filter plane 32 may be accomplished by the optical recording method of the D. S. Lo, et al, U.S. Pat. No. 3,995,280 in which optical signals are recorded in thermoplastic films under controlled electrical charging and then heating of the surface of a thermoplastic film. This recording in filter plane 32 is accomplished by using a plane-polarized reference beam C, generated by a laser 67, that is directed along an optical axis 65 and that is coherent with the input signals A and whose optical axis 65 is, as regards the optical axis 26 of signal A, at the same angle $\alpha$ as is the optical axis 27 of signal B. This recording in filter plane 32 is that of a "snapshot" of the signal Fourier transform of signal A at a recording time $t$. This recorded signal Fourier transform of signal A will be subsequently optically oriented with the real-time signal Fourier transform of signal B that is generated by signal processing channel 13 in a manner similar to the processing of input signal A that was accomplished by signal processing channel 12 except for the effect of the channelized cylindrical lens 25.

After recording of the Fourier transform of signal A in filter plane 32 and the generation of the Fourier transform of signal B at filter plane 32 by signal processing channel 13, filter plane 32 produces as an output signal therefrom the product of the one-dimensional Fourier transform of signal A and the one-dimensional Fourier transform of signal B with the second dimension representing doppler shift or frequency change. The cylindrical lens 34, from the output of filter plane 32, produces in the ambiguity plane of detector/display 36 the correlation of input signal A with input signal B for a range of time shifts and a range of doppler shifts as determined by the design of channelized cylindrical lens 25. Detector/display 36 may be of many and various designs such as a ground glass screen display for operator visual analysis of the light distribution displayed thereon or a charge coupled device (CCD) array of photo detectors that determines the XY coordinates of the individual light spots of selected intensities.

In the processing of signal B in signal processing channel 13, there is provided a channelized cylindrical lens 25 in place of the cylindrical lens 24 of signal processing channel 12. Channelized cylindrical lens 25 consists of a stack of cylindrical lenses of different focal lengths, whose thicknesses and focal lengths are chosen by the designer to provide the desired number and range of doppler shifts over which the correlation function is to be determined. Each elemental lens of channelized cylindrical lens 25 performs the same function as the cylindrical lens 24 of signal processing channel 12; however, the Fourier transforms performed by each elemental lens produce, at filter plane 32, a range of doppler shifts relative to signal A as stored in filter plane 32. Accordingly, the output of filter plane 32 contains the product of the one dimensional Fourier transform of signal A and the one dimensional Fourier transform of signal B with the second dimension representing a range of discrete doppler shifts. The cylindrical lens 34 then produces in the ambiguity plane of detector/display 36 the one dimensional Fourier transform of the output of the filter plane 32, which in the two dimensional detector/display 36 is presented as points of varying light intensity along the orthogonal axes X, representative of time shift, $\Delta t$, and Y, representative of doppler shift, $\Delta \omega$.

Figure 3:
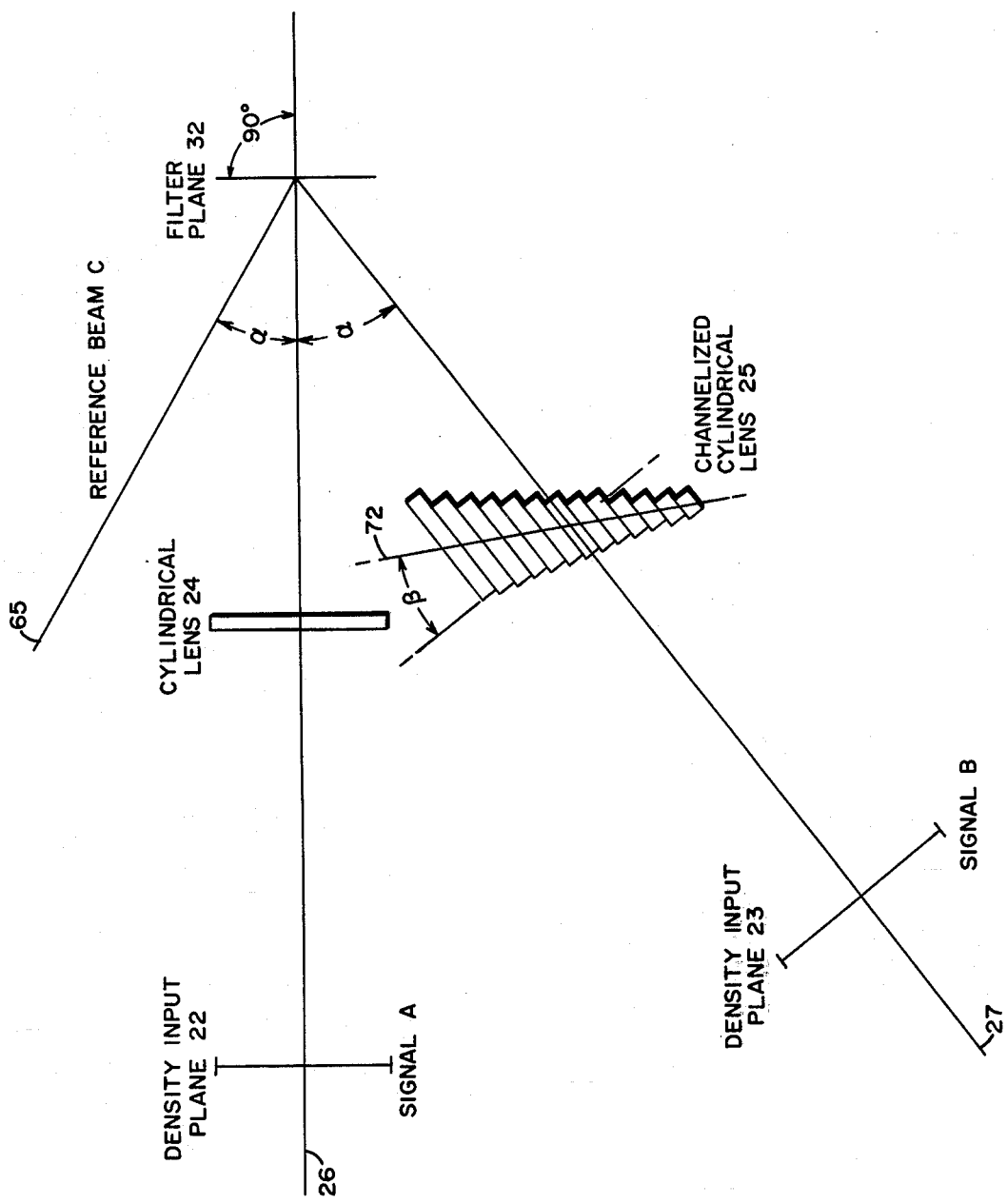
FIG. 3 is a diagrammatic illustration of the relationships of the filter plane with the channelized cylindrical lens of FIG. 1.

With particular reference to FIG. 3 there is presented an illustration of the channelized cylindrical lens 25 and its geometric relationships with the other components of the optical processing system of FIG. 1. The illustrated embodiment of FIG. 3 indicates that the optic axes 26, 27 and 65 are in the same plane, while optic axes 27 and 65 are oriented at the same angle $\alpha$ with respect to and on opposite sides of optic axis 26. Also illustrated, is the positioning of channelized cylindrical lens 25 as being equidistant between density input plane 23 and filter plane 32 at the focal length of convex lens 21 with the orientation of the center of each of the elemental lenses of channelized cylindrical lens 25 along an axis 72, which is in the same plane as the optic axes 26, 27 and 65 and, that is at an angle $90 - \beta$ with respect to optic axis 27. The center of each of the elemental lenses being a point that is at the intersection of the principal plane and of the optic axis of the elemental lens. This orientation of axis 72 orients the elemental lenses of channelized cylindrical lens 25 along the bisectors of lines parallel to optic axis 27 connecting density input plane 23 and filter plane 32 and through the elemental lenses.

Figure 5:
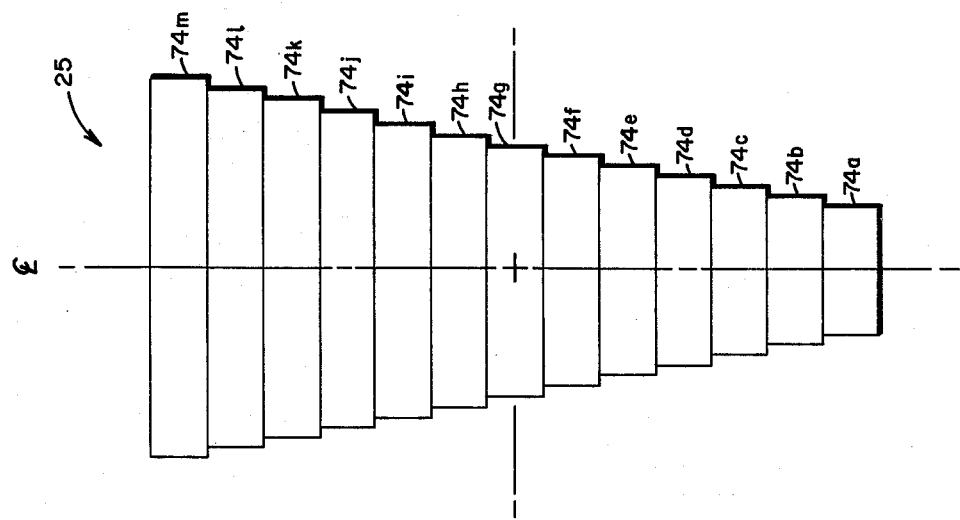
FIG. 5 is a front view of the channelized cylindrical lens of FIG. 4.
Figure 4:
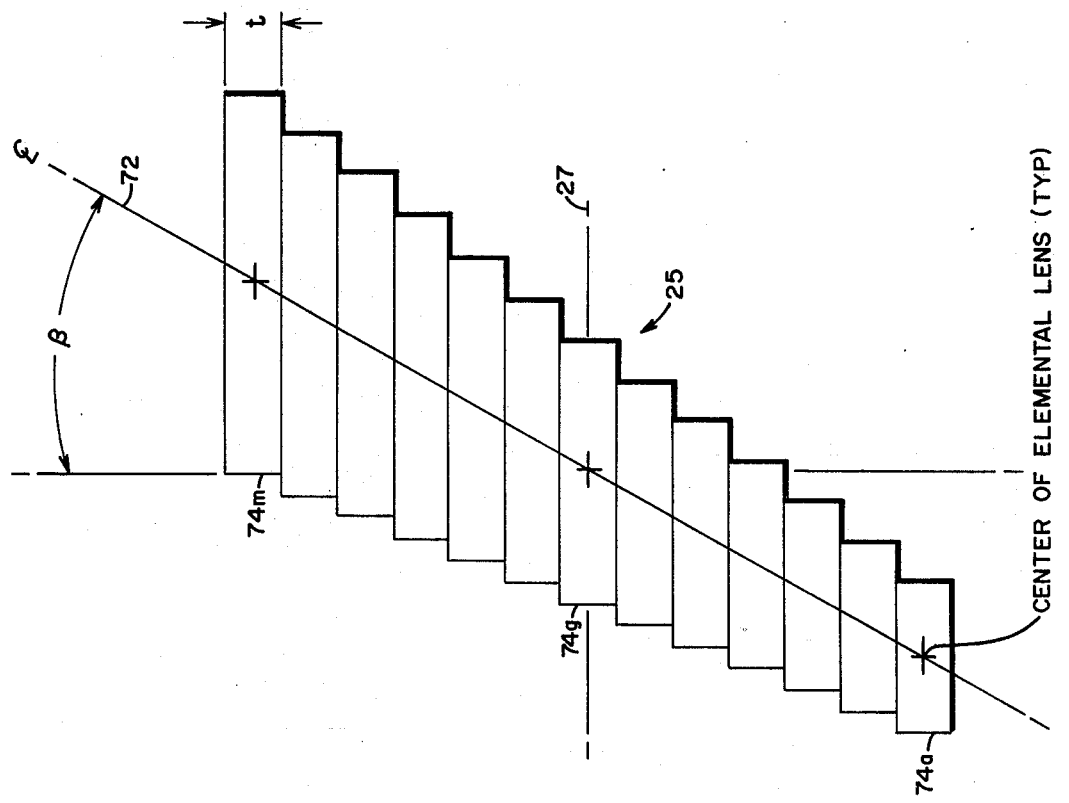
FIG. 4 is a side view of the channelized cylindrical lens of FIG. 1.

With particular reference to FIGS. 4 and 5 there are illustrated a side view and a front view of the typical channelized cylindrical lens 25 that may be utilized by the optical processing system of FIG. 1. Channelized cylindrical lens 25 consists of a plurality of, e.g., 13, elemental lenses 74a through 74m all of which have the same thickness t and each of which has a different focal length and the center of which is located at the midpoint of a line in the plane defined by optic axes 26, 27 and 65, between the density input plane 23 and the filter plane 32 and through the center of the elemental lens and parallel to optic axis 27.

The range of focal lengths of the elemental lenses 74a − 74m that is to be used determines the range of doppler shifts that is to be covered, and together with the thickness t of elemental lenses 74a − 74m determine the angle α between the optic axis 26 of signal processing channel B and the optic axis 27 of signal process channel A. This, in turn, fixes the orientation of the optic axis 65 of the reference beam C which optic axis 65 must be oriented at the corresponding angle α with respect to the optic axis 27 of signal processing channel A.

As an example of a design of a typical channelized cylindrical lens 25, one might choose the following thirteen convex lenses having the noted focal lengths for the channelized cylindrical lens 25:

| Lens | Focal Length |
|---|---|
| 74a | 97.0 cm |
| 74b | 97.5 cm |
| 74c | 98.0 cm |
| 74d | 98.5 cm |
| 74e | 99.0 cm |
| 74f | 99.5 cm |
| 74g | 100.0 cm |
| 74h | 100.5 cm |
| 74i | 101.0 cm |
| 74j | 101.5 cm |
| 74k | 102.0 cm |
| 74l | 102.5 cm |
| 74m | 103.0 cm | which listed focal lengths, together with a 100.0 cm focal length cylindrical lens 24 for signal processing channel A would provide the doppler shift range of ±3%. If each elemental lens of the channelized cylindrical lens 25 were 2.0 cm thick, i.e., $t = 2.0$ cm, then the angle α between the optic axis 27 of signal processing channel B and the optic axis 26 of signal processing channel A would be 26.57°.

What is claimed is:

1. An ambiguity plane optical processor that calculates the ambiguity function, $\Psi(\Delta w, \Delta t)$, of two signals A, B given by the equation $$\Psi(\Delta w, \Delta t) = \int A(t)B(t+\Delta t)e^{-j\Delta w t}dt$$

in which the correlation of the two signals A, B is given as a function of relative doppler shifts, $\Delta w$, and relative time shifts, $\Delta t$, comprising:
   filter plane means storing the hologram of the signal Fourier transform in one dimension of a light signal A;
   optical processing channel means for generating in a real-time light signal B a range of doppler shifts and producing at said filter plane means the signal Fourier transform in one dimension of said signal B having said range of doppler shifts therein; and,
   common optical signal processing channel means, including said filter plane means and an ambiguity plane detector means, for generating the product of said stored hologram of the signal Fourier transform in one dimension of said signal A and of said signal Fourier transform in one dimension of said signal B, said ambiguity plane detector means displaying said product as the correlation of said signals A and B with the relative time shifts displayed along the X axis and the relative doppler shifts displayed along the Y axis.

2. An ambiguity plane optical processor that calculates the ambiguity function, $\Omega(\Delta w, \Delta t)$, of two signals A, B given by the equation $$\Psi(\Delta w, \Delta t) = \int A(t)B(t+\Delta t)e^{-j\Delta w t}dt$$

in which the correlation of the two signals A, B is given as a function of relative doppler shifts, $\Delta w$, and relative time shifts, $\Delta t$, comprising:
   filter plane means for optically storing the hologram of the signal Fourier transform in one dimension of a instantaneous snap shot of a real-time light signal A;
   optical processing channel means for generating in a real-time light signal B a range of doppler shifts and producing at said filter plane means the signal Fourier transform in one dimension of said signal B having said range of doppler shifts therein; and,
   common optical signal processing channel means, including said filter plane means and an ambiguity plane detector means, for generating the product of said stored hologram of the signal Fourier transform in one dimension of said instantaneous snap shot of said signal A and of said signal Fourier transform in one dimension of said signal B, said ambiguity plane detector means displaying said product as the correlation of said signals A and B with the relative time shifts displayed along the X axis and the relative doppler shifts displayed along the Y axis.

3. An ambiguity plane optical processor that calculates the ambiguity function, $\Psi(\Delta w, \Delta t)$, of two signals A, B given by the equation $$\Psi(\Delta w, \Delta t) = \int A(t)B(t+\Delta t)e^{-j\Delta w t}dt$$

in which the correlation of the two signals A, B is given as a function of relative doppler shifts, $\Delta w$, and relative time shifts, $\Delta t$, comprising:
   filter plane means for optically storing the hologram of an optical signal;
   first optical processing channel means operating upon an area modulated light signal A for generating at said filter plane means the signal Fourier transform in one dimension of said signal A;
   reference optical channel means generating at said filter plane means a reference signal for storing in said filter plane means the hologram of the signal Fourier transform in one dimension of an instantaneous snap shot of said signal A;
   second optical processing channel means for generating from an area modulated light signal B a range of relative doppler shifts and producing at said filter plane means the signal Fourier transform in one dimension of said signal B having said range of relative doppler shifts therein; and, common optical signal processing channel means, including said filter plane means and an ambiguity plane detector means, for generating the product of said stored hologram of the signal Fourier transform in one dimension of said instantaneous snap shot of said signal A and of said signal Fourier transform in one dimension of said signal B, said ambiguity plane detector means displaying said product as the correlation of said signals A and B with the relative time shifts displayed along the X axis and the relative doppler shifts displayed along the Y axis.

4. An ambiguity plane optical processor that calculates the ambiguity function, $\Psi(\Delta w, \Delta t)$, of two signals A, B given by the equation $$\Psi(\Delta w, \Delta t) = \int A(t)B(t+\Delta t)e^{-j\Delta w t}dt$$

in which the correlation of the two signals A, B is given as a function of relative doppler shifts, $\Delta w$, and relative time shifts, $\Delta t$, comprising:

filter plane means for optically storing the hologram of an optical signal;

first optical processing channel means operating upon an area modulated light signal A and generating at a density input plane the Fourier transform of the Fourier transform of the area modulated light signal A in a two-dimensional density representation for generating at said filter plane means the signal Fourier transform in one dimension of said signal A;

reference optical channel means generating at said filter plane means a reference signal for storing in said filter plane means the hologram of the signal Fourier transform in one dimension of an instantaneous snap shot of said signal A;

second optical processing channel means including a channelized cylindrical lens that is comprised of a plurality of elemental lenses of predetermined increasing focal lengths, each of said lenses forming a one-dimensional Fourier transform, but of a different scale factor, that generates a corresponding doppler shift, $\Delta w$, in an area modulated light signal B and generating at a density input plane the Fourier transform of the Fourier transform of said signal B in a two dimensional density representation for generating at said filter plane means the signal Fourier transform in one dimension of said signal B having a range of relative doppler shifts, $\Delta w$, that are incorporated therein by said channelized cylindrical lens; and, common optical signal processing channel means, including said filter plane means and an ambiguity plane detector means, for generating the product of the hologram of the signal Fourier transform in one dimension of said instantaneous snap shot of said signal A that is stored in said filter plane means and of said signal Fourier transform in one dimension of said signal B, said ambiguity plane detector means displaying said product as the correlation of the relative time shifts, $\Delta t$, and the relative doppler shifts, $\Delta w$, of said signals A and B.

5. An ambiguity plane optical processor that calculates the ambiguity function, $\Psi(\Delta w, \Delta t)$, of two signals A, B given by the equation $$\Psi(\Delta w, \Delta t) = \int A(t)B(t+\Delta t)e^{-j\Delta w t}dt$$

in which the correlation of the two signals A, B is given as a function of relative doppler shifts, $\Delta w$, and relative time shifts, $\Delta t$, comprising:

filter plane means for optically storing the hologram of an optical signal;

first optical processing channel means operating upon an area modulated light signal A and generating at a density input plane the Fourier transform of the Fourier transform of said signal A in a two-dimensional density representation for generating at said filter plane means the signal Fourier transform in one dimension of said signal A;

reference optical channel means generating at said filter plane means a reference signal for storing in said filter plane means the hologram of the signal Fourier transform in one dimension of an instantaneous snap shot of said signal A;

second optical processing channel means including a channelized cylindrical lens that is comprised of a plurality of elemental lenses of predetermined increasing focal lengths, said lenses oriented along a first axis that passes through the center of each of said lenses, each of said lenses having two opposing parallel faces that are parallel to the optic axis thereof, said first axis oriented at an angle $90-\beta$ with respect to said two opposing parallel faces for offsetting the center of each of said lenses, each of said lenses operating upon an area modulated light signal B and forming a one-dimensional Fourier transform, but of a different scale factor, that generates a corresponding doppler shift, $\Delta w$, and generating at a density input plane the Fourier transform of the Fourier transform of said signal B in a two-dimensional density representation for generating at said filter plane means the signal Fourier transform in one dimension of said signal B having a range of doppler shifts, $\Delta w$, that are incorporated therein by said channelized cylindrical lens; and, common optical signal processing channel means, including said filter plane means and an ambiguity plane detector means, for generating the product of the hologram of the signal Fourier transform in one dimension of said instantaneous snap shot of said signal A that is stored in said filter plane means and of said signal Fourier transform in one dimension of said signal B, said ambiguity plane detector means displaying said product as the correlation of the time shifts, $\Delta t$, and the doppler shifts, $\Delta w$, of said signals A and B.

* * * * *